US009014738B2

(12) United States Patent
Gebert

(10) Patent No.: US 9,014,738 B2
(45) Date of Patent: Apr. 21, 2015

(54) DYNAMIC ALLOCATION OF SPECTRUM SENSING RESOURCES IN A COGNITIVE RADIO NETWORK

(75) Inventor: Jens Gebert, Oberstenfeld (DE)

(73) Assignee: Alcatel Lucent, Boulogne-Billancourt (FR)

( * ) Notice: Subject to any disclaimer, the term of this patent is extended or adjusted under 35 U.S.C. 154(b) by 291 days.

(21) Appl. No.: 13/639,616

(22) PCT Filed: Apr. 1, 2011

(86) PCT No.: PCT/EP2011/055085
§ 371 (c)(1),
(2), (4) Date: Oct. 5, 2012

(87) PCT Pub. No.: WO2011/124529
PCT Pub. Date: Oct. 13, 2011

(65) Prior Publication Data
US 2013/0053080 A1 Feb. 28, 2013

(30) Foreign Application Priority Data
Apr. 7, 2010 (EP) .................................... 10290183

(51) Int. Cl.
*H04W 72/04* (2009.01)
*H04W 76/02* (2009.01)
*H04W 28/08* (2009.01)
*H04W 48/08* (2009.01)
*H04W 48/16* (2009.01)

(52) U.S. Cl.
CPC .............. *H04W 76/02* (2013.01); *H04W 28/08* (2013.01); *H04W 48/08* (2013.01); *H04W 48/16* (2013.01)

(58) Field of Classification Search
CPC ... H04W 28/08; H04W 28/085; H04W 28/10; H04W 28/12; H04W 28/16; H04W 28/18; H04W 28/20; H04W 28/24; H04W 28/26; H04W 72/00; H04W 72/005; H04W 72/021; H04W 72/04; H04W 72/044; H04W 72/0493
USPC .................. 455/453, 511, 509, 517, 436, 557, 455/556.1, 420, 447, 435.2, 458, 464, 62, 455/63.3, 522, 127.4, 452.1, 450; 370/328, 370/329
See application file for complete search history.

(56) References Cited

U.S. PATENT DOCUMENTS 6,134,443 A * 10/2000 Spann et al. ................... 455/450
6,771,968 B1   8/2004 Heubel
(Continued)

FOREIGN PATENT DOCUMENTS

CN        1798371 A    7/2006
CN     101438512 A    5/2009
(Continued)

OTHER PUBLICATIONS

International Search Report for PCT/EP2011/055085 dated May 19, 2011.
(Continued)

*Primary Examiner* — Tan Trinh
(74) *Attorney, Agent, or Firm* — Fay Sharpe LLP

(57) ABSTRACT

A method of communicating in a wireless telecommunication network includes establishing a control channel at a control channel frequency in a first frequency band between a wireless terminal and a base station gathering information about a second frequency band indicative of at least a first portion of the second frequency band not being allocated to at least one other device and/or service; determining if the traffic load in the first frequency band is above a traffic load threshold; transmitting control channel data from the base station to the wireless terminal if the traffic load in the first frequency band is above the traffic load threshold; and establishing a communication channel at the communication channel frequency between the wireless terminal and the base station if the traffic load in the first frequency band is above the traffic load threshold. A base station associated with the method is also provided.

20 Claims, 4 Drawing Sheets

(56) References Cited

U.S. PATENT DOCUMENTS

| | | | |
|---|---|---|---|
| 7,865,192 B2* | 1/2011 | Fukumoto et al. | 455/452.2 |
| 2002/0090942 A1* | 7/2002 | Karabinis et al. | 455/427 |
| 2002/0111163 A1 | 8/2002 | Hamabe | |
| 2004/0204071 A1* | 10/2004 | Bahl et al. | 455/557 |
| 2006/0073827 A1* | 4/2006 | Vaisanen et al. | 455/436 |
| 2006/0094431 A1 | 5/2006 | Saifullah et al. | |
| 2006/0116148 A1* | 6/2006 | Bahl et al. | 455/517 |
| 2007/0091720 A1 | 4/2007 | Woo et al. | |
| 2007/0200755 A1 | 8/2007 | Hamilton et al. | |
| 2008/0159208 A1 | 7/2008 | Kloker et al. | |
| 2010/0029216 A1 | 2/2010 | Jovicic et al. | |
| 2011/0034166 A1* | 2/2011 | Karabinis et al. | 455/427 |
| 2011/0170519 A1 | 7/2011 | Zhang et al. | |

FOREIGN PATENT DOCUMENTS

| | | |
|---|---|---|
| CN | 101668319 A | 3/2010 |
| EP | 0 521 610 A2 | 1/1993 |
| EP | 1 750 466 A1 | 2/2007 |
| EP | 2112858 A1 | 10/2009 |
| JP | 11-341555 A | 12/1999 |
| JP | 2008306665 A | 12/2008 |

OTHER PUBLICATIONS da Silva et al., A dynamic channel allocation mechanism for IEEE 802.11 networks, 2006 Int'l Telecommunications Symposium, Sep. 3-6, 2006; pp. 225-230.

Harrold et al., Spectrum shaing and cognitive radio, 2009 Ultra Modern Telecommunications & Workshops, Oct. 12-14, 2009; pp. 1-8.

Wong et al., Dynamic spectrum access with preemption in open spectrum wireless networks, 11th IEEE Singapore Int'l Conference on Communication Systems, Nov. 19-21, 2008; pp. 1021-1025.

Wong et al., Dynamic spectrum access with prioritization in open spectrum wireless networks, 11th IEEE Singapore Int'l Conference on Communication Systems, Nov. 19-21, 2008; pp. 1026-1030.

English Bibliography for Chinese Patent Application Publication No. CN1798371A, published Jul. 5, 2006, printed from Thomson Innovation on Nov. 30, 2014, 3 pp.

English Bibliography for Chinese Patent Application Publication No. CN101438512A, published May 20, 2009 printed from Thomson Innovation on Nov. 30, 2014, 5 pp.

English Bibliography for Chinese Patent Application Publication No. CN101668319A, published Mar. 10, 2010, printed from Thomson Innovation on Nov. 30, 2014, 3 pp.

English Bibliography for Japanese Patent Application Publication No. JP11341555A, published Dec. 10, 1999, printed from Thomson Innovation on Nov. 30, 2014, 4 pp.

English Bibliography for Japanese Patent Application Publication No. JP2008306665A, published Dec. 18, 2008, printed from Thomson Innovation on Nov. 30, 2014, 4 pp.

PCT Pat. App. No. PCT/EP2011/055085, Written Opinion of the International Searching Authority, mailed May 19, 2011, 4 pp.

European Patent Application No. 10290183.2, Extended European Search Report, mailed Sep. 10, 2010, 5 pp.

* cited by examiner

DYNAMIC ALLOCATION OF SPECTRUM SENSING RESOURCES IN A COGNITIVE RADIO NETWORK

FIELD OF THE INVENTION

The invention relates to a method, a base station apparatus and a computer readable storage medium for communicating in a wireless telecommunication network, more specifically to a method of using white space frequencies for wireless telecommunication.

BACKGROUND AND RELATED ART

The ultra-high frequency (UHF) white space frequencies are commonly used for digital video broadcasts (DVB-7) and wireless microphones. The UHF frequency band lies in the range from 470-790 MHz. The DVB-T TV broadcasters do not use the whole frequency range for DVB-T broadcasting. Wireless microphones may also communicate in this frequency range and may be switched on and off dynamically without interfering with other wireless microphones and/or DVB-T servers. Because of the relatively small coverage area of a wireless microphone the use of a certain frequency for a wireless microphone has not to be registered at a central network entity. The same applies in some regions or countries for other devices with a small coverage area.

US 2008/159208 A1 discloses a method and apparatus for allocation of shared spectrum in a wireless communication system using a radio frequency beacon signal that is transmitted between access points of the wireless communication system.

EP 1 750 466 A1 discloses a communication network including a set of user terminals such as a cellular network of a WLAN. The communication network includes a system for dynamically controlling spectrum usage.

SUMMARY OF THE INVENTION

It is the object of the present invention to provide an improved method of communicating in a wireless telecommunication network, an improved base station apparatus and an improved computer readable storage medium. This object is achieved by the method, the base station apparatus and the computer readable storage medium according to the independent claims. Embodiments of the invention are given in the dependent claims.

The invention provides a method of communicating in a wireless telecommunication network, wherein the method comprises the following steps:

According to the invention a control channel is established at a control channel frequency in a first frequency band between a wireless terminal and a base station of the wireless communication network. The first frequency band is exclusively used for wireless telecommunication and may for example be a GSM, UMTS or LTE network. The wireless terminal may for example be a mobile phone, a PDA or a mobile computer. The control channel is used for transmitting control information from the base station to the wireless terminal and vice versa. Control information may for example be information about a communication channel, which is assigned from the base station to the wireless terminal, or for example data being relevant for the control mechanisms in the base station requested by the base station from the wireless terminal. In general the control channel functions like a control channel as known from standard control channels in GSM, UMTS or LTE.

In a second step information is gathered about a second frequency band. The information is indicative of at least a first portion of the second frequency band not being allocated to at least one other device and/or server. The second frequency band is preferably a white space frequency band between 470 and 790 MHz, which corresponds to the above mentioned UHF white space frequency band. In other words, information is gathered, if at least a first portion of the second frequency band is not used by at least one other device for wireless communication. It is to be noted that the at least one other device may also be a DVB-T TV broadcast sender or any other broadcast sender, which only transmits signals on the second frequency band but does not receive signals on the second frequency band. The at least one other service may for example be any TV or radio broadcast service such as DVB-T.

In a third step it is determined, if the traffic load in the first frequency band is above a traffic load threshold. In this step the traffic load in the first frequency band is determined because it may be advantageous to source out some traffic from the first frequency band to the second frequency band.

In a fourth step control channel data is transmitted via the control channel from the base station to the wireless terminal, if the traffic load in the first frequency band is above the traffic load threshold. The control channel data comprises a communication channel frequency in the second frequency band of a communication channel. The control channel data is in other words indicative of a communication channel frequency in the second frequency band of a communication channel. In other words, the base station transmits a frequency of the second frequency band to the wireless terminal via the control channel for sourcing out traffic from the first frequency band to the second frequency band by transmitting the communication channel frequency, wherein the communication channel frequency lies in the second frequency band. The communication channel is adapted for being used for communication of the wireless terminal with the base station. The communication channel may for example be used for telephone calls, data transmission, e.g. internet data transmission, or any other telecommunication being established from the wireless terminal to another device via the base station.

In a fifth step a communication channel at the communication channel frequency is established between the wireless terminal and the base station, if the traffic load in the first frequency band is above the traffic load threshold. It is to be noted that the last two steps are only performed if the traffic load in the first frequency band is above the traffic load threshold. This means communication is only outsourced to the second frequency band from the first frequency band in case the traffic load in the first frequency band has exceeded the traffic load threshold.

The method according to the invention is advantageous because in case of high traffic loads some traffic may be outsourced to the first frequency band, which is a white space frequency band, e.g. the UHF white space frequency band reaching from 470-790 MHz. The first frequency band, where the control channel is established is preferably a frequency band, which is licensed to the operator of the wireless telecommunication network. Contrary to the white space frequency band the first frequency band may only be used by this operator of the wireless telecommunication network.

When sourcing out traffic to the second frequency band, which is the white space frequency band, care has to be taken not to disturb any other communication in the white space frequency band. This is avoided by gathering the information about the second frequency band. Because the frequencies in the white space frequency band are not necessarily registered at a central entity, information of used and unused frequencies must be gathered. The gathering may comprise for example sensing for communication in the second frequency band or accessing a database, where used or allocated frequencies in the second frequency band are stored. Once again, it is emphasized that the at least one other device may for example also be a sender of digital video or audio broadcasts. The allocation of a frequency in the second frequency band may also be performed by one device without communicating the allocation to another device. This may be for example a wireless microphone, which allocates itself a certain frequency in the second frequency band without communicating this allocation to any other device or entity. The wireless microphone may also communicate the frequency to another device receiving signal such as audio data from the wireless microphone. Such an allocation cannot be detected by accessing a database because the allocation is not registered anywhere. Thus, such an allocation has to be detected by sensing the use of this device. Sensing may be performed by the base station and/or by the wireless terminal, After gathering the information the communication channel is established at the communication channel frequency in the second frequency band. This establishing step considers the gathered information and establishes the communication channel at a communication channel frequency, where no interferences or any other disturbance with the at least one other device and/or servers is expected.

According to embodiments of the invention at least one second portion of the second frequency band is used for terrestrial digital video and/or audio broadcast. This does not mean that the at least one second portion of the second frequency band is used exclusively for digital video and/or audio broadcast but may also be used for wireless telecommunication or other wireless communication. Some portions of the second frequency band may for example be used for digital video and/or audio broadcast in a first area, while the same portion may be used for wireless telecommunication in a second area, wherein the first and the second area do not overlap. This corresponds to the definition of white space frequencies. White space frequencies are in general frequencies which may be used by a certain service or device such as a DVB-T sender but are locally not used by this service or device.

According to embodiments of the invention the step of gathering information comprises sensing the use of frequencies in the second frequency band by the base station and/or the wireless terminal and/or reading the use of frequencies in the second frequency band from a database.

According to embodiments of the invention the control channel data comprises the bandwidth to be used by the communication channel. This is advantageous for limiting the used bandwidth and avoiding interferences or any other disturbances of communication performed by at least one other device and/or servers in the second frequency band.

According to embodiments of the invention the method comprises further the steps of modifying the communication channel and/or dismantling the communication channel. Instructions to modify or to dismantle the communication channel is transmitted from the base station to the wireless terminal via the control channel. Modifying and/or dismantling the communication channel may be advantageous, when the used communication channel frequency causes problems to other devices and/or at least one other device is switched on, which causes interferences and/or other disturbances to the communication of the wireless terminal.

According to embodiments of the invention the method comprises further the steps of determining a velocity of the wireless terminal, determining if the velocity is below a velocity threshold, and establishing the communication channel, only if the velocity is below the velocity threshold. These three method steps are advantageous because communication is only outsourced to the second frequency band, if the velocity of the wireless terminal is below a velocity threshold. This is advantageous because fast-moving wireless terminals may easily disturb communication of devices using frequencies in the second frequency band without registering anywhere. When only the traffic of slow-moving wireless terminals, which means that their velocity is below the velocity threshold, is outsourced to the second frequency band, fast changes in the electromagnetic environment of the wireless terminal can be avoided.

According to embodiments of the invention the method further comprises the following steps, when the at least one portion of the second frequency band is allocated to the at least one other device and/or service, and when the wireless terminal is being moved with, a velocity along a trajectory:

determining the velocity of the wireless terminal;
predicting the trajectory of the wireless terminal;
calculating a first time value using the velocity and the trajectory, the first time value being indicative of a time period, after which the communication channel is established. The velocity and the trajectory of the wireless terminal may for example be determined by common GSM, UMTS or LTE techniques or by a GPS method, if the wireless terminal has a GPS receiver. Embodiments of the invention are advantageous because the first time value, which is calculated based on the velocity and the trajectory may indicate a time point, at which it is advantageous to establish the communication channel in the second frequency band. Thus, from the time point on when the communication channel may be established no time is lost for any further communication and the communication channel is established on time. The time point is determined according to the gathered information, the velocity and the trajectory of the wireless terminal. The time point is chosen such that no communication of any other device in the second frequency band is disturbed by the communication channel. This method is advantageous, if the wireless terminal is expected to be located in a region, where the at least one portion of the second frequency band is not allocated to any device and/or service after the time period. At this time point, the communication channel is established at the communication channel frequency.

According to embodiments of the invention the method comprises further the step of calculating a second time value by using the velocity and the trajectory, the second time value being indicative of the maximum time period between establishing the communication channel and dismantling the communication channel. In other words, the second time value is the period during which the communication channel is established. For example for a fast-moving wireless terminal communication via the communication channel is only possible for a certain amount of seconds or minutes, before communication of another device in the second frequency band is disturbed by the telecommunication of the wireless terminal because the wireless terminal moves towards the other device.

According to embodiments of the invention, the communication channel is established, only if the maximum time period between establishing the communication channel and dismantling the communication channel is above a time threshold. This is advantageous for avoiding offloading or outsourcing connections for only short times. It is desirable by the operator to rather outsource connections of wireless terminals, which are expected to be outsourced for a comparable long time period.

According to embodiments of the invention authentication data, authorization data, location data, and routing area data are transmitted via the control channel from the wireless terminal to the base station. Authentication data and authorization data is transmitted to the base station for identifying the wireless terminal. The authentication and authorization data is for example stored on the subscriber identity module (SIM) of the wireless terminal. The authentication and authorization data identifies the wireless terminal, the user of the wireless terminal, and/or the servers to be used by the user/the wireless terminal. Authentication and authorization is performed according to standards of GSM, UMTS and/or LTE networks. Location data is advantageously transmitted to the base station for letting the base station gather information concerning the use of the at least one portion of the second frequency band in the area of the wireless terminal. The base station has to know where the wireless terminal is located for gathering information of used frequencies in this area. Routing area data is transmitted from the wireless terminal to the base station via the control channel for updating information in the base station for internet connections of the wireless terminal.

According to embodiments of the invention the wireless terminal comprises spectrum sensing means. The spectrum sensing means are adapted to sense, if the first portion of the second frequency band is used by the at least one other device and/or servers. The sensing means detect the use of the first portion of the second frequency band from primary users such as DVB-T senders for example or wireless microphones being located near the wireless terminal. A near location to the wireless terminal is characterized herein as the fact that the wireless terminal is located in the coverage area of the wireless microphone. Instead of a wireless microphone or a DVB-T sender any other device using frequencies in the second frequency band may be sensed by the sensing means of the wireless terminal. This is mandatory for not disturbing communication of any other device in the second frequency band. Also other mobile communication may be sensed by the wireless terminal through the sensing means. For example other wireless terminals being near to the wireless terminal may already communicate on the second frequency band. This is also sensed by the sensing means. This is advantageous for avoiding interferences and to find a suitable communication channel frequency without causing interferences or any other disturbance with other communicating devices. The wireless terminal further comprises transmitting means, the transmitting means being adapted to transmit a signal to the base station. The signal is indicative of the first portion of the second frequency band being used by the at least one other device. This step is advantageous for transmitting the information gathered by the sensing means to the base station. The base station then decides which portion of the second frequency band is used for the communication channel frequency. The base station avoids the use of a frequency being already used by another device.

In another aspect the invention relates to a base station apparatus comprising
    means for establishing a control channel at a control channel frequency in a first frequency band between a wireless terminal and a base station of the wireless communication network, the first frequency band being exclusively used for wireless telecommunication;
    means for gathering information about a second frequency band, the information being indicative of at least a first portion of the second frequency band not being allocated to at least one other device and/or service;
    means for determining if the traffic load in the first frequency band is above a threshold;
    means for transmitting control channel data via the control channel from the base station to the wireless terminal, if the traffic load in the first frequency band is above the threshold, wherein the control channel data comprises a communication channel frequency in the second frequency band of a communication channel;
    means for establishing a communication channel at the communication channel frequency between the wireless terminal and the base station, if the traffic load in the first frequency band is above the threshold.

In yet another aspect the invention relates to a computer-readable storage medium containing instructions that when executed by a base station apparatus according to claim 8 cause the base station apparatus to perform a method of communicating in a wireless telecommunication network, the method comprising:
    establishing a control channel at a control channel frequency in a first frequency band between a wireless terminal and a base station of the wireless communication network, the first frequency band being exclusively used for wireless telecommunication;
    gathering information about a second frequency band, the information being indicative of at least a first portion of the second frequency band not being allocated to at least one other device and/or service;
    determining if the traffic load in the first frequency band is above a threshold;
    transmitting control channel data via the control channel from the base station to the wireless terminal, if the traffic load in the first frequency band is above the threshold, wherein the control channel data comprises a communication channel frequency in the second frequency band of a communication channel;
    establishing a communication channel at the communication channel frequency between the wireless terminal and the base station, if the traffic load in the first frequency band is above the threshold.

BRIEF DESCRIPTION OF THE DRAWINGS

In the following preferred embodiments of the invention will be described, by way of example only and with reference to the drawings in which.

DETAILED DESCRIPTION

Like numbered elements in these Figs. are either identical elements or perform the same function. Elements which have been discussed previously will not necessarily be discussed in later Figs. if the function is identical.

Figure 1:
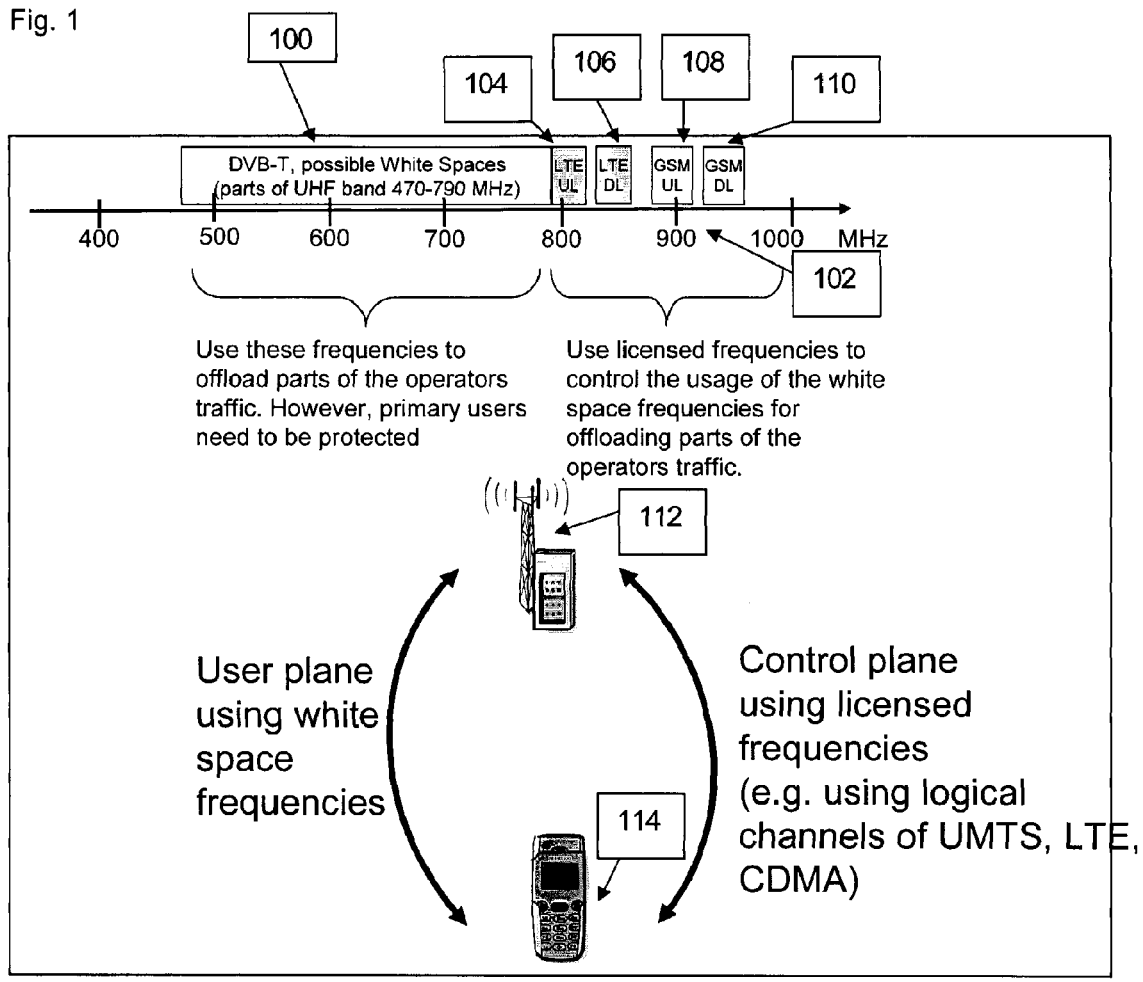
FIG. 1 is a schematic view of a frequency spectrum and the use of part of the frequency spectrum for control and for communication issues.

FIG. 1 is a schematic view of a frequency spectrum reaching from 400-1000 MHz. The frequency spectrum comprises a plurality of frequency bands. A first frequency band 102 may for example reach from 790-970 MHz. A second frequency band 100 is located for example between 470 and 790 MHz and is called white space frequency band 100. In different parts of the world the first and the second frequency band may comprise different frequencies and/or frequency ranges. The first frequency band 102 consists of portions, which are referred to as LTE uplink 104, LTE downlink 106, GSM uplink 106, and GSM downlink 108. The first frequency band 102 may also comprise portions for communication according to the UMTS or CDMA standard. The first frequency band 102 comprises licensed frequencies to control the usage of the white space frequencies in the second frequency band 100 for offloading parts of the operators traffic. Usually, the traffic in a wireless telecommunication network is transmitted in the licensed frequency range, which corresponds to the first frequency band 102. When traffic load in a cell of the wireless telecommunication network exceeds a cell load threshold it is advantageous to source out or offload parts of the traffic into the white space frequency band, which corresponds to the second frequency band 100. Care has to be taken not to disturb primary users. Primary users are herein understood as users being originally using the white space frequency band 100. This may for example be DVB-T senders and/or other devices not registering their frequency allocation in a central network entity, such as wireless microphones. Information about used and unused, or in other words allocated and not allocated portions of the white space frequency band 100 is gathered by the base station 112. The use of frequencies may also be detected by sensing means of a wireless terminal 114.

The base station 112 controls the communication of the wireless terminal 114. The base station 112 decides when to source out or offload communication of the wireless terminal to a communication channel being located in the white space frequency band 100. The control channel stays in the licensed frequency band 102. This is advantageous because by controlling the wireless terminal 114 via the licensed frequency band 102 no other communication device is disturbed. The base station sends control channel data via the control channel and communication data via the communication channel in the white space frequency band 100. Because the communication channel frequency is sent to the wireless terminal via the control channel no other communication is disturbed. The base station 112 knows about the used and unused, or in other words allocated and not allocated frequencies in the white space frequency band 100. Preferably, communication channels in the white space frequency band 100 are only established for wireless terminal 114 below a velocity threshold. If the wireless terminal 114 would be moved faster than the velocity threshold, interferences with other devices would become more probable and it may be advantageous to offload the communication of another not depicted wireless terminal to the white space frequency band 100. The control channel in the licensed frequency band 102 functions according to the standards of UMTS, LTE or GSM. Also the communication of the wireless terminal with the base station 112 via the communication channel in the white space frequency band 100 works according to UMTS, LTE or GSM standards. The control channel does not disturb or interfere with primary users in the white space frequency band 100, because the control channel lies in the licensed frequency band 102, where only wireless telecommunication takes place.

Figure 2:
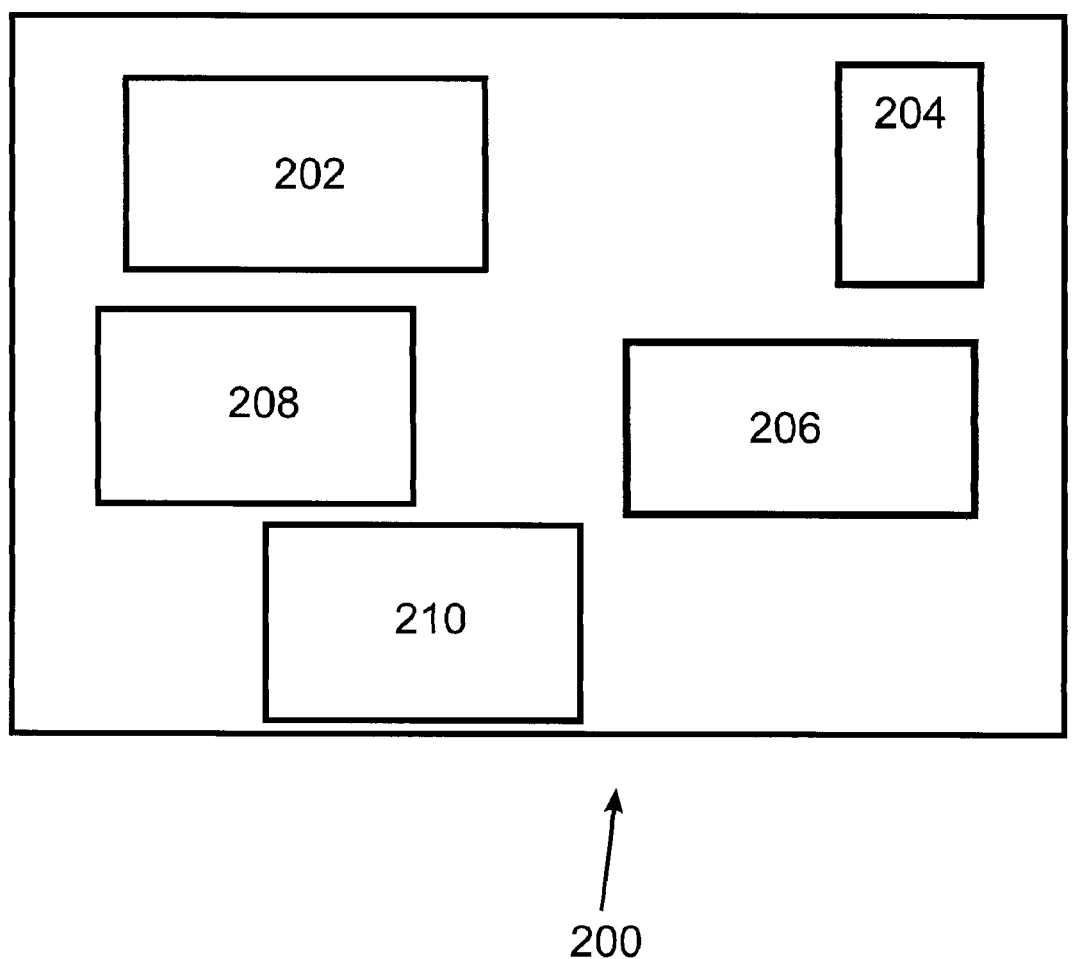
FIG. 2 is a block diagram of a base station apparatus being operable to perform a method according to embodiments of the invention.

FIG. 2 is a block diagram of a base station 200. The base station 200 comprises means 202 for establishing a control channel at a control channel frequency in a first frequency band between a wireless terminal and a base station of the wireless communication network, the first frequency band being exclusively used for wireless telecommunication. The base station 200 further comprises means 204 for gathering information about a second frequency band, the information being indicative of at least a first portion of the second frequency band not being allocated to at least one other device and/or service. Means 206 are adapted to determine, if the traffic load in the first frequency band is above a traffic load threshold. Furthermore, the base station 200 comprises means 208 for transmitting control channel data via the control channel from the base station to the wireless terminal, if the traffic load in the first frequency band is above the threshold, wherein the control channel data comprises a communication channel frequency in the second frequency band of a communication channel. Means 210 are adapted to establish a communication channel at the communication channel frequency between the wireless terminal and the base station, if the traffic load in the first frequency band is above the threshold.

In operation, the base station 200 establishes a control channel between itself and a wireless terminal by using means 202. Then, information about the second frequency band, which is also referred to as the white space frequency band, is gathered with means 204. The gathered information is used later on by means 210 for establishing a communication channel with the wireless terminal. The communication channel is established, only if means 206 have determined, that the traffic load in the first frequency band is above the traffic load threshold. This is advantageous for sourcing out traffic load in a wireless telecommunication cell into the white space W frequency band without causing interferences or disturbing the communication of primary users in the white space frequency in any other way. The control channel lies in the first frequency band, which comprises frequencies licensed for wireless telecommunication. Thereby, interferences or disturbances caused by the control channel are avoided.

Figure 3:
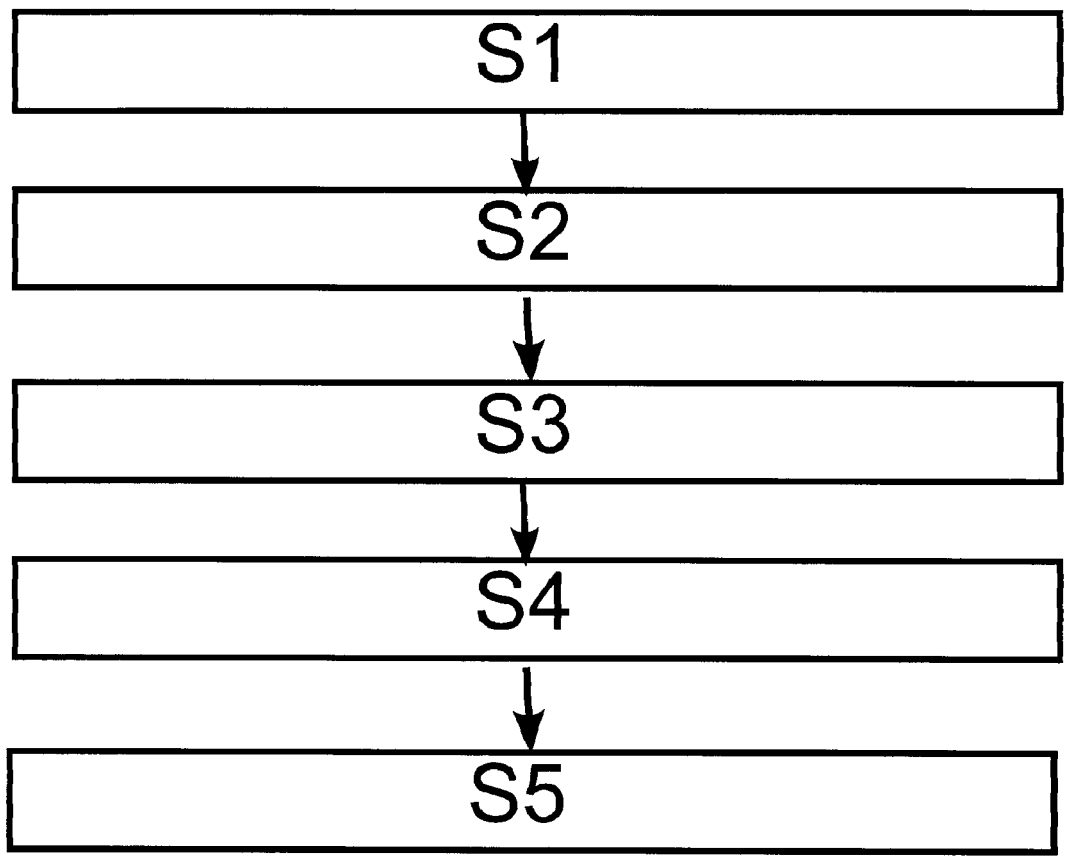
FIG. 3 is a flow diagram of a method of communicating in a wireless telecommunication network.

FIG. 3 is a flow diagram of a method according to embodiments of the invention. In a first step S1 a control channel at a control channel frequency in a first frequency band between is established. The control channel serves for controlling the connection of a wireless terminal to a base station of the wireless communication network. The control channel lies in the first frequency band, which is used exclusively for wireless telecommunication. Controlling is performed according to standards of the wireless telecommunication network, e.g. GSM, UMTS or LTE standards.

In a second step S2 information is gathered about a second frequency band. The second frequency band is for example a white space frequency band, which could for example be used for DVB-T and/or wireless microphones or other devices with a small coverage area. The gathered information is indicative of at least a first portion of the second frequency band not being allocated to at least one other device and/or service such as a wireless microphone and/or DVB-T. It is again to be noted that the at least one other device may for example be a DVB-T sender. The frequency of a wireless microphone may for example be only allocated in the wireless microphone and the respective receiver.

In a third step S3 it is determined, if the traffic load in the first frequency band is above a traffic load threshold. After this determination, a fourth step S4 is performed. The fourth step comprises transmitting control channel data via the control channel from the base station to the wireless terminal, if the traffic load in the first frequency band is above the traffic load threshold. The control channel data comprises a communication channel frequency of a communication channel. The communication channel frequency lies in the second frequency band. In other words, the communication channel in the second frequency band is established, only if the traffic load in the respective cell is so high that the operator may want to offload or outsource some traffic. In this case, an offloading or outsourcing of traffic into the second frequency band is advantageous for reducing traffic in the first frequency band.

In a fifth step S5 a communication channel between the wireless terminal and the base station is established at the communication channel frequency, if the traffic load in the first frequency band is above the traffic load threshold.

It is to be noted that the order of these steps is not necessarily limited to S1-S2-S3-S4-S5. Any other reasonable order may alternatively be applied to perform a method according to embodiments of the invention.

Figure 4:
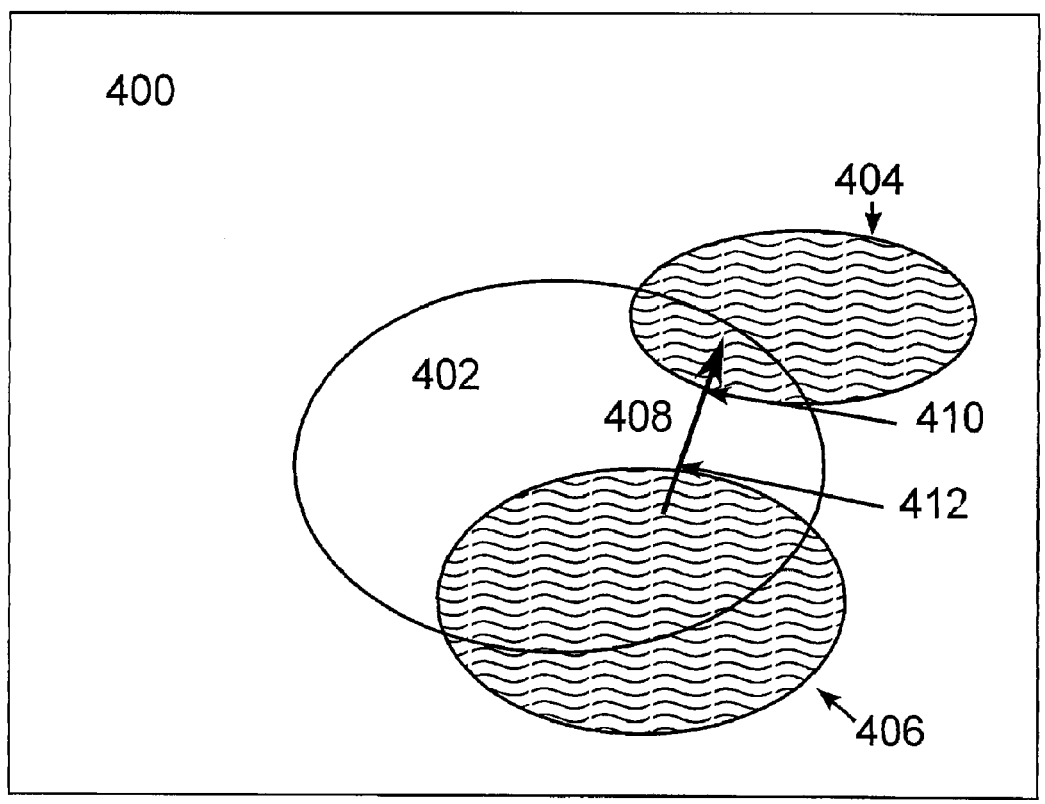
FIG. 4 is a schematic view of a cell of a wireless telecommunication network

FIG. 4 is a schematic view of a cell 402 of a wireless telecommunication network. Communication in cell 402 takes place in the first frequency band according to GSM, UMTS or LTE standards. The second frequency band corresponds to white space frequency band 400. White space frequency band 400 is available anywhere in cell 402 and also outside cell 402. In regions 404 and 406 at least a portion of the white space frequency band 400 is allocated to at least one other device and/or service, which may for example be DVB-T transmissions and/or the use of a wireless microphone.

A wireless terminal is moved along trajectory 408 with a certain velocity. Based on the trajectory 408 and the velocity, the base station (not depicted) of cell 402 is able to determine the maximum time period, in which the wireless terminal may use the at least one portion in the white space frequency band 400. The maximum time period is the time between the time point, when the wireless terminal exits region 406 at the geographical point 412, and the time point, when the wireless terminal enters region 404 at the geographical point 410.

| List of reference numerals | |
|---|---|
| 100 | White space frequency band |
| 102 | Licensed frequencies band |
| 104 | LTE uplink |
| 106 | LTE downlink |
| 108 | GSM uplink |
| 110 | GSM downlink |
| 112 | Base station |
| 114 | Wireless terminal |
| 200 | Base station |
| 202 | Means for establishing control channel |
| 204 | Means for gathering information |
| 206 | Means for determining traffic load |
| 208 | Means for transmitting control channel data |
| 210 | Means for establishing communication channel |
| 400 | White space frequency band |
| 402 | Cell |
| 404 | Region |
| 406 | Region |
| 408 | Trajectory |
| 410 | Geographical point |
| 412 | Geographical point |

The invention claimed is:

1. A method of communicating in a wireless telecommunication network, wherein the method comprises
   establishing a control channel at a control channel frequency in a first frequency band between a wireless terminal and a base station of the wireless communication network, the first frequency band being exclusively used for wireless telecommunication;
   gathering information about a second frequency band, the information being indicative of at least a first portion of the second frequency band not being allocated to at least one other device and/or service;
   determining if the traffic load in the first frequency band is above a traffic load threshold;
   transmitting control channel data via the control channel from the base station to the wireless terminal, if the traffic load in the first frequency band is above the traffic load threshold, wherein the control channel data comprises a communication channel frequency in the second frequency band of a communication channel;
   establishing a communication channel at the communication channel frequency between the wireless terminal and the base station, if the traffic load in the first frequency band is above the traffic load threshold.

2. Method according to claim 1, wherein at least a second portion of the second frequency band is used for terrestrial digital video and/or audio broadcast.

3. Method according to claim 1, wherein the gathering comprises
   sensing the use of frequencies in the second frequency band by the base station and/or reading the use of frequencies in the second frequency band from a database.

4. Method according to claim 1, wherein the control channel data comprises the bandwidth to be used by the communication channel.

5. Method according to claim 1, wherein the method further comprises
   modifying the communication channel; and/or
   dismantling the communication channel.

6. Method according to claim 1, wherein the method further comprises:
   determining a velocity of the wireless terminal;
   determining if the velocity is below a velocity threshold;
   establishing the communication channel if the velocity is below the velocity threshold.

7. Method according to claim 1, wherein the at least one portion of the second frequency band is allocated to the at least one other device and/or service, wherein the wireless terminal is being moved with a velocity along a trajectory, wherein the method further comprises:
   determining the velocity of the wireless terminal;
   predicting the trajectory of the wireless terminal;
   calculating a first time value using the velocity and the trajectory, the first time value being indicative of a time period, after which the wireless terminal is expected to be located in a region, where the at least one portion of the second frequency band is not allocated to any device and/or service;
   establishing the communication channel at the communication channel frequency.

8. Method according to claim 7, wherein the method further comprises:
   calculating a second time value by using the velocity and the predicted trajectory, the second time value being indicative of the maximum time period between establishing the communication channel and dismantling the communication channel.

9. Method according to claim 8, wherein the communication channel is established if the maximum time period between establishing the communication channel and dismantling the communication channel is above a time threshold.

10. Method according to claim 1, wherein authentication data, authorization data, location data and routing area data are transmitted via the control channel from the wireless terminal to the base station.

11. Method according to claim 1, wherein the wireless terminal is configured to sense if the first portion of the second frequency band is used by the at least one other device and/or service;

wherein the wireless terminal is configured to transmit a signal to the base station indicative of the first portion of the second frequency band being used by the at least one other device.

12. A base station for a wireless communication network, wherein the base station is configured to establish a control channel at a control channel frequency in a first frequency band between a wireless terminal and a base station of the wireless communication network, the first frequency band being exclusively used for wireless telecommunication;
   wherein the base station is configured to gather information about a second frequency band, the information being indicative of at least a first portion of the second frequency band not being allocated to at least one other device and/or service;
   wherein the base station is configured to determine if the traffic load in the first frequency band is above a traffic load threshold;
   wherein the base station is configured to transmit control channel data via the control channel from the base station to the wireless terminal, if the traffic load in the first frequency band is above the threshold, wherein the control channel data comprises a communication channel frequency in the second frequency band of a communication channel;
   wherein the base station is configured to establish a communication channel at the communication channel frequency between the wireless terminal and the base station, if the traffic load in the first frequency band is above the threshold.

13. The base station according to claim 12, wherein at least a second portion of the second frequency band is used for terrestrial digital video and/or audio broadcast.

14. The base station according to claim 12, wherein the base station is configured to sense the use of frequencies in the second frequency band and/or read the use of frequencies in the second frequency band from a database.

15. The base station according to claim 12, wherein the control channel data comprises the bandwidth to be used by the communication channel.

16. The base station according to claim 12, wherein the based station is configured to modify the communication channel and/or dismantle the communication channel.

17. The base station according to claim 12, wherein the base station is configured to determine a velocity of the wireless terminal;
   wherein the base station is configured to determine if the velocity is below a velocity threshold;
   wherein the base station is configured to establish the communication channel if the velocity is below the velocity threshold.

18. The base station according to claim 12, wherein the at least one portion of the second frequency band is allocated to the at least one other device and/or service;
   wherein the base station is configured to determine the velocity of the wireless terminal, while the wireless terminal is being moved with a velocity along a trajectory;
   wherein the base station is configured to predict the trajectory of the wireless terminal;
   wherein the base station is configured to calculate a first time value using the velocity and the trajectory, the first time value being indicative of a time period, after which the wireless terminal is expected to be located in a region, where the at least one portion of the second frequency band is not allocated to any device and/or service;
   wherein the base station is configured to establish the communication channel at the communication channel frequency.

19. The base station according to claim 12, wherein authentication data, authorization data, location data and routing area data are transmitted via the control channel from the wireless terminal to the base station.

20. A non-transitory computer-readable medium storing program instructions that, when executed by at least one processor, cause a base station to perform a method of communicating in a wireless telecommunication network, the method comprising:
   establishing a control channel at a control channel frequency in a first frequency band between a wireless terminal and a base station of the wireless communication network, the first frequency band being exclusively used for wireless telecommunication;
   gathering information about a second frequency band, the information being indicative of at least a first portion of the second frequency band not being allocated to at least one other device and/or service;
   determining if the traffic load in the first frequency band is above a traffic load threshold;
   transmitting control channel data via the control channel from the base station to the wireless terminal, if the traffic load in the first frequency band is above the threshold, wherein the control channel data comprises a communication channel frequency in the second frequency band of a communication channel;
   establishing a communication channel at the communication channel frequency between the wireless terminal and the base station, if the traffic load in the first frequency band is above the threshold.

* * * * *